United States Patent [19]
Lower

[11] Patent Number: 6,114,438
[45] Date of Patent: *Sep. 5, 2000

[54] OIL RESISTANT SILICONE SEALANTS

[75] Inventor: Loren Dale Lower, Midland, Mich.

[73] Assignee: Dow Corning Corporation, Midland, Mich.

[*] Notice: Under 35 U.S.C. 154(b), the term of this patent shall be extended for 546 days.

[21] Appl. No.: 08/524,661

[22] Filed: Sep. 8, 1995

[51] Int. Cl.$^7$ ....................................................... C08K 3/26
[52] U.S. Cl. ............................ 524/788; 524/731; 528/17; 528/33; 528/34; 528/901
[58] Field of Search .................................... 524/731, 788; 528/17, 33, 34, 901

[56] References Cited

U.S. PATENT DOCUMENTS

| | | |
|---|---|---|
| 3,189,576 | 6/1965 | Sweet . |
| 3,274,145 | 9/1966 | Dupree . |
| 4,395,526 | 7/1983 | White et al. ................................ 528/18 |
| 4,514,529 | 4/1985 | Beers et al. ............................. 523/200 |

FOREIGN PATENT DOCUMENTS

WO93/19130  9/1993  WIPO .

*Primary Examiner*—Robert Dawson
*Attorney, Agent, or Firm*—Jennifer S. Warren; Patricia M. Scaduto

[57] ABSTRACT

An oxime curable silicone sealant composition with good oil resistance can be formulated, using calcium carbonate filler with higher water content than previously known to be useful. The sealant formulation is adjusted to accommodate higher water content by adjusting the ketoximosilane crosslinker level. The correct amount of crosslinker is determined by the hydroxy content present from both the silanol on the base polymer and the water content of the filler.

20 Claims, No Drawings

OIL RESISTANT SILICONE SEALANTS

FIELD OF INVENTION

This invention relates to a composition for low modulus, non-corrosive, one component room temperature vulcanizing silicone sealants, suitable for formed-in-place gaskets to be used in contact with hot hydrocarbon oil.

BACKGROUND ART

The use of room temperature vulcanizing (RTV) silicone sealants for creating formed-in-place gaskets is well known in both original equipment manufacture and in engine repair and maintenance. A problem with conventional silicone sealants is their tendency to swell in the presence of oil, when the silicone is used to form a gasket. Improved resistance to swelling in the presence of oil is desirable.

Traditional means of improving oil resistance involve the use of comparatively high cross-link densities of the polymers. See, for instance, U.S. Pat. No. 4,257,932. The result is lower elongation properties and, hence reduced movement capabilities. Low modulus, high elongation, silicone rubbers are desirable as gaskets to accommodate joint movement due to vibration and thermal cycling. The lower modulus causes less stress to be exerted on the sealant-metal bond interface, decreasing the risk of failure.

U.S. Pat. No. 4,514,529, to Beers et al., discloses a low modulus RTV silicone sealant which is resistant to swelling, and has high elongation. The silicone elastomer is formed of silanol terminated diorganosiloxane base polymer, a tin catalyst, a ketoximosilane crosslinking agent, and low moisture calcium carbonate fillers. The compositions containing stearic acid treated $CaCO_3$, according to Beers et al., have a modulus at 100% elongation of 110 psi (758 kPa) or less, with 90 psi (532 kPa) being preferred.

Beers, however, teaches that the moisture content of calcium carbonate must be limited to prevent curing of the sealant in the tubes. If small amounts of filler, 15% or less by weight in the sealant formulation, are used, the water level could range up to 0.4% by weight, based upon the total weight of the filler. For levels of filler over 15%, the water content is limited to a maximum of 0.2% by weight, with about 0.1% by weight, or less being preferred.

Sweet teaches ketoximosilane crosslinking agents for silicone RTV sealants in U.S. Pat. No. 3,189,576. Sweet also states that it is desirable that the filler be dry before admixing with the sealant composition. Sweet teaches that some water can be tolerated on the filler if an excess of ketoximosilane crosslinker is employed for reinforcing and non-reinforcing silicas, metallic oxides, and fibrous fillers such as asbestos or glass. No additional information is given as to the level of excess ketoximosilane to be employed. Sweet does not specify the use of calcium carbonates in oxime curing systems. White, et. al, in U.S. Pat. No. 4,395,526, teach silane scavengers that can be employed to remove hydroxy radicals such as the silanol radicals on silica filler used in acetoxy or alkoxy cure sealant. The silane scavenger has a generic formula,

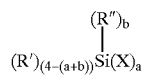

where R' is an aliphatic organic radical with from 1 to 8, inclusive, carbon atoms, R" is a monovalent organic radical from 1 to 13, inclusive, carbon atoms, and X is a hydrolyzable leaving group. Oximato groups are included as possible hydrolyzable leaving groups, but trioximo or tetraoximo silanes are not disclosed. The White, et. al patent also does not address scavengers in an oxime cure system, using calcium carbonate fillers.

Dziark, in patent application WO 93/19130, discloses an oil resistant silicone made from a combination of a silanol terminated diorganosiloxane polymer, a trimethyl-endblocked polydiorganosiloxane fluid, a silica filler, a calcium carbonate filler, gamma-aminopropyl triethoxysilane, a tin catalyst, and methyl or vinyltris (methylethylketoximo)silane crosslinking agent. The calcium carbonate is shown to improve the oil resistance, while the gamma-aminopropyl triethoxysilane is shown to improve adhesion. Dziark's compositions require the use of a silica filler.

SUMMARY OF THE INVENTION

An oxime curable silicone sealant composition with good oil resistance can be formulated, using calcium carbonate filler with higher water content than previously known to be useful. The sealant formulation is adjusted to accommodate higher water content by adjusting the ketoximosilane crosslinker level. The correct amount of crosslinker is determined by the hydroxy content present from both the silanol on the base polymer and the water content of the filler. An equivalent ratio greater than about 1.2 moles ketoximosilane to hydroxy may be used, with about 1.3 to 2.5 being preferred.

DESCRIPTION OF PREFERRED EMBODIMENT

This invention relates to a composition for oil resistant sealants suitable for gaskets in contact with hot hydrocarbon oils. This composition is prepared by combining a base polymer, an optional plasticizing agent, crosslinking agents, calcium carbonate fillers, tin catalyst, and an optional adhesion promoting additive, and allows the use of calcium carbonate fillers with higher moisture than previously known to be useful. The base polymer is a polydiorganosiloxane of viscosity 1 Pa.s to 300 Pa.s, in which the terminal radicals are in part silanol and, optionally, in part triorganosilyl groups. The optional plasticizng agent is a triorganosilyl endblocked diorganosiloxane fluid. The crosslinking agents are ketoximosilanes. The calcium carbonate filler is selected from ground and precipitated fillers, or may be a combination of ground and precipitated fillers. The water content of the calcium carbonate fillers, either alone or as an average in a filler mixture, is in excess of 0.25%, based on the weight of the filler. The tin catalyst is a condensation catalyst. An organofunctional alkoxysilane can be used as an adhesion promotion additive.

The base polymer is a linear polydiorganosiloxane in which the terminal radicals are silanol. Optionally, the terminal radicals may be, in part, triorganosilyl groups. Where both ends are endblocked with silanol, the polymer is of the formula $HOSiR_2O(SiR_2O)_xSiR_2OH$, where x is of a value such that the polymer has an average viscosity of from 1.0 to 300 Pa.s at 25° C. R is any of those monovalent hydrocarbon, or monovalent halohydrocarbon radicals of 1 to 18 inclusive carbon atoms which are known to be useful in silicone sealant materials. The preferred radicals for R are methyl, ethyl, propyl, phenyl, vinyl, and trifluoropropyl, with methyl most preferred. The preferred viscosity of the polymer is from 5 to 100 Pa.s at 25° C. Lower viscosities give cured sealants which have high modulus because of the high amount of crosslinking, while higher viscosities give sealants with a low extrusion rate.

The methods of manufacture of these hydroxyl endblocked polydiorganosiloxanes are well known in the art. One common method is based upon the hydrolysis of diorganodichlorosilane, the separation of the tetrasiloxane cyclic material from the hydrolysis mixture, and the subsequent polymerization of the cyclic material to the polydiorganosiloxane through the use of an alkaline catalyst.

To vary the physical properties of the final sealant, a base polymer with fewer silanol groups available for crosslinking may be desired. This is preferred in the present invention, where a relatively low modulus sealant is desired. Some of the hydroxyl endblocked polymer is capped on one end with a triorganosiloxy endblocker to give a polymer of the formula $R'_3SiO(R_2SiO)_xSiR_2OH$, where $R'$ is any of those monovalent hydrocarbon, or monovalent halohydrocarbon radicals of 1 to 8, inclusive, carbon atoms which are known to be useful in silicone sealant materials. The preferred radicals for $R'$ are methyl, ethyl, propyl, phenyl, vinyl, and trifluoropropyl, with methyl most preferred. R and x are described above. A polymer with 10 to 20% of its ends capped with trimethylsiloxy groups, leaving 80 to 90% of its ends capped with SiOH, has been found to be useful. Methods for obtaining such polymers are described by Dupree in U.S. Pat. No. 3,274,145, issued Sep. 20, 1966, which is hereby incorporated by reference to show these polymers and their preparation.

The amount of base polymer in the sealant formulation can be from 25 to 75 weight %, based on the total weight of sealant with 35 to 55% being preferred.

The optional plasticizing agent is represented by the formula $R_3SiO(R_2SiO)_ySiR_3$, where R is described above, and y is such that the avaerage viscosity is 0.1 to 10 Pa.s., or preferably 1 to 5 Pa.s. Preferably the R group in the plasticizer is the same as the R group in the silanol endblocked diorganosiloxane polymer to ensure compatibility. Therefore when R is methyl in the silanol endblocked diorganosiloxane, it is, preferably, methyl in the optional plasticizing agent. Plasticizing agent may be used in amounts up to about 25% by weight of the sealant composition.

The oxime crosslinking agents, alternatively known as ketoximosilanes, are represented by the formula

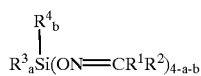

where $R^1$, $R^2$, and $R^3$ are monovalent hydrocarbons which may be the same or different from each other, a is 0 or 1, $R^4$ is an alkoxy, and b is 0 to 2, inclusive. Preferred radicals for $R^1$ and $R^2$ on the ketoximosilane are methyl ethyl, amyl or isobutyl. Preferred radicals for $R^3$ on the ketoximosilane are methyl, ethyl, butyl, or vinyl.

The most preferred crosslinking agents are vinyltris(methylethylketoximo)silane or methyltris(methylethylketoximo)silane. Mixtures of these crosslinking agents are also useful. Mixtures of methyltris(methylethylketoximo)silane, methyldi(methylethylketoximo)methoxysilane, and methyldimethoxy(methylethylketoximo)silane have also been found to be useful.

In the present invention, the correct amount of crosslinker is determined by the amount of silanol equivalents present from both the silanol on the polymer and the water content of the filler. A silanol equivalent is calculated as the amount of OH available. An equivalent ratio of greater than about 1.2 moles ketoximosilane to silanol equivalent may be used, with about 1.3 to 2.5 being preferred.

As an example, the amount of crosslinker for a sealant with 45 grams of polymer with 0.07% OH (by weight of the polymer), 37 grams of a first filler with 0.4% water, and 5 grams of a second filler with 0.1% water would be calculated as follows:

OH on polymer: 45 g × 0.070/100 = 0.032 g OH = 0.0018 equivalents
OH on 1st filler: 37 g × 0.40/100 = 0.15 g $H_2O$ = 0.017 equivalents
OH on 2nd filler: 5.0 g × 0.10/100 = 0.0050 g $H_2O$ = 0.00056 equivalents
Total moles of OH = 0.019 equivalents Moles of crosslinker to be used for a ratio of 1.3 to 2.5=0.025 to 0.048 If crosslinker used in this example is methyltris(methylethylketoximo)silane, with molecular weight of 301.5, the amount of crosslinker would then be 7.5 g to 14 g.

Calcium carbonate fillers are known to improve oil resistance of silicone sealants. However, as described in the background art, it was disclosed that such fillers must have extremely low moisture content in order to be used without curing in the tube. In the present invention, calcium carbonate fillers of moisture greater than 0.25% by weight are useful.

Calcium carbonate fillers useful for this invention are available in two general types, ground and precipitated. These calcium carbonates can be surface treated or can be untreated. Ground calcium carbonate is used as an extending filler, and has minimal effect on physical properties. Stearate treated ground calcium carbonates are available commercially, such as Gama-Sperse® CS-11 from Georgia Marble Company, Kennesaw, Ga.; and OMYACARB® FT from OMYA Inc., Proctor, Vt. An untreated ground calcium carbonate OMYA Carb UF, is also available from OMYA, Inc. Treated, precipitated calcium carbonates include, Winnofil® SPM is available from ICI Chemicals and Polymers, and Socal 312N, available from Solvay, Brussels, Belgium. An untreated, precipitated calcium carbonate is Albacar 5970, available from Specialty Minerals, Easton, Pa. Precipitated calcium carbonate is a reinforcing filler, and can improve properties such as tensile strength.

The fillers may be used alone or in combination with each other or other fillers to give a total filler level of 17 to 65%, by weight, based on the total weight of the sealant. A combination of about 2 to about 20% ground calcium carbonate and about 15 to about 60% precipitated calcium carbonate, based on the weight of the sealant composition has been found to be useful.

The use of calcium carbonate in combination with a silica filler is known. The use of precipitated calcium carbonate in place of all or part of a silica filler in a combination with ground calcium carbonate unexpectedly gives superior elongation properties, in addition to improved oil resistance.

An epoxy functional alkoxysilane can be used as an additive to improve adhesion. It is known that aminoalkoxy silanes, such as those used in WO 93/19130, while improving adhesion, can reduce the oil resistance of sealant formulations. This reduced oil resistance is measured by the swelling, or volume increase, of the sealant on exposure to oil. By replacing the aminoalkoxy silane with epoxy functional alkoxysilane, better adhesion results with less deterioration of other sealant properties. The present invention uses up to about 2% epoxy functional alkoxysilane, based on the weight of the sealant formulation. The preferred amount of epoxy functional alkoxysilane is about 0.3 to 1.0% by weight, based on the total weight of the sealant formulation.

The alkoxy groups on the adhesion promoter react with water in the sealant formulation. Therefore, the adhesion promoter can be expected to lower, by a small amount, the amount of excess crosslinker required to accommodate the water on the filler and the hydroxyl endgroups of the polymer. In 100 g of sealant with 0.3% to 1.0% gamma-glycidoxypropyltrimethoxysilane, there would be 1.3 to 4.2 millimoles of gamma-glycidoxypropyltrimethoxysilane, based on a molecular formula of 236.3 g/mol. Therefore, 1.3 to 4.2 fewer millimoles of ketoximosilane crosslinker could be used.

EXAMPLE 1

Components consisting of, by weight, 49.8% silanol endblocked polydimethylsiloxane, with viscosity of about 15 Pa.s, and with about 15% of the silanol capped with trimethylsilyl groups;

7.6% of a crosslinker mixture of
  77% methyltris(methylethylketoximo)silane,
  22.5% methyldi[methylethylketoximo]methoxysilane and
  0.5% methyldimethoxy(methylethylketoximo)silane, based on the weight of the crosslinker mixture;

0.43% gamma-glycidoxypropyl trimethoxysilane;

36.8% Winnofil SPM, precipitated calcium carbonate with water content of 0.35 wt %;

5.3% CS-11 ground calcium carbonate with moisture of 0.1%; and 0.05% dimethyltinbisneodecanoate were mixed together and stored in a sealant tube for 19 months.

In this example, the molecular weight of the base polymer was approximately 62,000 gram-moles. In 100 grams of sealant, there would be 49.8 grams of base polymer, or $8.08 \times 10^{-4}$ moles of polymer. The silanol endgroups available on the base polymer, with about 15% of its ends blocked with trimethylsilyl groups was about $1.36 \times 10^{-3}$ moles. The silanol equivalent due to water on the precipitated calcium carbonate was about $1.47 \times 10^{-2}$ moles, and the silanol equivalent due to the water on the ground calcium carbonate was about $6.1 \times 10^{-4}$ moles. The total silanol equivalent for the water and two fillers was therefore about $1.67 \times 10^{-2}$ moles. The average molecular weight of the crosslinker mixture was 289. Therefore the 7.6 grams of crosslinker used gave a crosslinker-to-silanol equivalent ratio of about 1.58.

The sealant did not cure during storage, and continued to be workable after 19 months. Shelf life was determined by measuring the extrusion rate. Extrusion rate is the weight, in grams per minute (g/min), of the uncured sealant extruded through a ⅛ inch (3.2 mm) orifice when the sealant is under a pressure of 90 psi (620 kPa). An acceptable extrusion rate for this application is from 100 to 500 g/min. In this sample the extrusion rate changed from 213 to 132 g/min over 19 months.

Another test of shelf life was the effect of aging on the ability to cure, as measured by tack free time. The tack free time is defined as the time in minutes required for a curing material to form a non-tacky surface film. A sample is spread on a clean smooth surface and timing is begun. Periodically, a clean strip of polyethylene film is laid upon a fresh surface, light finger pressure is applied to it, then the finger is removed an the strip gently pulled off. The time when the strip pulls cleanly away from the sample is recorded as the tack free time. The initial tack free time for this sample was 73 to 95 minutes. After 19 months the tack free time was 100 to 120 minutes.

EXAMPLE 2

Silicone sealant compositions were prepared by mixing the following ingredients in a manner to exclude atmospheric moisture, with the resulting compositions being stored in containers to protects them from atmospheric moisture until the compositions were used to make cured products. The compositions did not cure in their tubes after 4 weeks at 23° C. The ingredients were:

base polymer: polydimethylsiloxane having a viscosity of 16.5 Pa.s with about 85% of the terminal groups being silicon-bonded hydroxyl and about 15% of the terminal groups being trimethylsiloxy (that is, $2.7 \times 10{-5}$ moles OH per gram of base polymer);

plasitcizer: trimethylsiloxy terminated polydimethylsiloxane fluid having a viscosity of 1.0 Pa.s;

first filler: high purity, fine, ground, stearate-treated natural calcium carbonate with a surface area of about 6 $m^2/g$, and a moisture content of 0.1% by weight {Gama-sperse® CS-11, manufactured by Georgia Marble Company, Kennesaw, Ga.};

second filler: high purity, precipitated, stearic acid treated calcium carbonate, with a moisture content of about 0.35% by weight, {Winnofil® SPM by ICI };

epoxy functional silane: gamma-glycidoxypropyltrimethoxysilane;

catalyst: dimethyltinbisneodecanoate;

ketoximosilane crosslinker: The ketoximosilane crosslinker was changed for each sample as shown in Table 1 for each composition prepared. Crosslinker 1 is methyltris(methylethylketoximo) silane, molecular weight of 301.4. Crosslinker 2 is vinyltris(methylethylketoximo)silane, molecular weight of 313.5. Crosslinker 3 is a mixture of 77% methyltri(methylethylketoximo)silane, 22% methyldi(methylethylketoximo)methoxysilane and 0.5% methyldimethoxy(methylethylketoximo)silane, based on the weight of the crosslinker mixture.

The amounts of each ingredient, along with the crosslinker to silanol equivalent ratio, is in Table 1.

TABLE 1

| | Sealant forumlations and crosslinker to silanol equivalent ratio | | | | | | | | | |
|---|---|---|---|---|---|---|---|---|---|---|
| Sample | Crosslinker to silanol equivalent ratio | Base polymer parts | Plasticizer parts | First filler parts | Second filler parts | Epoxy functional silane | Catalyst | Crosslinker 1 | Crosslinker 2 | Crosslinker 3 |
| A | 1.39 | 100 | 12 | 11.1 | 82.2 | 1.11 | 0.22 | 15.5 | 0 | 0 |
| B | 1.38 | 100 | 12 | 11.1 | 82.2 | 1.11 | 0.22 | 11.1 | 4.44 | 0 |
| C | 1.37 | 100 | 12 | 11.1 | 82.2 | 1.11 | 0.22 | 6.66 | 8.88 | 0 |
| D | 1.43 | 100 | 12 | 11.1 | 82.2 | 1.11 | 0.22 | 6.66 | 0 | 8.88 |
| E | 1.35 | 100 | 12 | 11.1 | 82.2 | 1.11 | 0.22 | 2.2 | 13.3 | 0 |
| F | 1.34 | 100 | 12 | 11.1 | 82.2 | 1.11 | 0.22 | 0 | 15.5 | 0 |
| G | 1.35 | 100 | 0 | 9.9 | 73.4 | 0.99 | 0.20 | 5.9 | 7.9 | 0 |

Each composition was tested as to its suitability for use to make gaskets by measuring tensile strength at break, elongation at break, and the modulus at 100% elongation by ASTM Standard D-412; and durometer on the Shore A scale by ASTM Standard D-2240.

The skin over time is defined as the time in minutes required for the material to cure to the point where it no longer adheres to a clean fingertip lightly applied to the surface. The cure conditions are 23° C. and 50% relative humidity. The tack free time is defined in example 1. The initial sealant properties are recorded in Table 2.

TABLE 2

| Sample number from Table 1 | Skin Over Time min. | Tack free time min. | Durometer Shore A | Tensile psi (kpa) | Elongation % | Modulus at 100% psi (kPa) |
|---|---|---|---|---|---|---|
| A | 25 | 40 | 30 | 259 (1790 kPa) | 622 | 77 (530 kPa) |
| B | 24 | 40 | 32 | 275 (1890 kPa) | 582 | 80 (551 kPa) |
| C | 27 | 50 | 31 | 253 (1740 kPa) | 557 | 79 (544 kPa) |
| D | 27 | 45 | 31 | 289 (1990 kPa) | 582 | 82 (564 kPa) |
| E | 33 | 70 | 31 | 260 (1790 kPa) | 544 | 83 (572 kPa) |
| F | 60 | 105 | 31 | 269 (1850 kPa) | 577 | 81 (551 kPa) |
| G | 26 | 50 | 35 | 247 (1700 kPa) | 485 | 94 (648 kPa) |

The suitability of the sealant in contact with oil was tested by immersing cured sealant sample tabs in 5 W30 weight motor oil at 150° C. for a period of 7 days, followed by a determination of swell and effect on physical properties. The cured sealant samples had initial dimensions of about 1.9 cm×3.8 cm×018 cm. An initial weight was recorded for the tabs. After the tabs had been in the oil for 7 days, the oil and the tabs were cooled to room temperature. The tabs were removed from the oil, blotted with a wipe, rinsed with acetone, and the acetone allowed to dissipate. Swell was determined as the amount of oil absorbed by the tabs as determined by the percentage weight increase of the tabs. Durometer, tensile strength at break, elongation at break, and 100% modulus were measured following oil immersion, as well, and the results are in Table 3. These data show that the compositions still have good performance and relatively low swell after exposure to oil.

TABLE 3

| Sample number from Table 1 | % Swell | Durometer Shore A | Tensile psi (kPa) | Elongation % | 100% Modulus psi (kPa) |
|---|---|---|---|---|---|
| A | 34 | 15 | 240(1650 kPa) | 367 | 75(516 kPa) |
| B | 31 | 16 | 241(1660 kPa) | 346 | 79(544 kPa) |
| C | 30 | 14 | 207(1430 kPa) | 433 | 69(475 kPa) |
| D | 29 | 16 | 227(1560 kPa) | 432 | 75(517 kPa) |
| E | 28 | 16 | 228(1570 kPa) | 471 | 73(503 kPa) |
| F | 26 | 19 | 252(1750 kPa) | 412 | 86(593 kPa) |
| G | 32 | 18 | 248(1710 kPa) | 378 | 86(593 kPa) |

What is claimed is:

1. A room temperature curing silicone sealant composition utilizing high moisture fillers, formed by combining, based on the weight of the silicone sealant composition:

25 to 75% diorganosiloxane base polymer of viscosity 1.0 Pa.s to 300 Pa.s, in which the terminal groups are selected from the group consisting of silanol and triorganosilyl groups, provided that at least 60% of the terminal groups are silanol groups;

0 to 25% triorganosilyl endblocked polydiorganosiloxane fluid of viscosity 0.1 Pa.s to 10 Pa.s;

17 to 65% calcium carbonate filler, where the filler contains greater than 0.25% water by weight;

0.01 to 2% tin catalyst;

0 to 2.0% of an epoxy-functional alkoxysilane; and an amount of a ketoximosilane of the formula

where $R^1$, $R^2$, and $R^3$ are monovalent hydrocarbons which may be the same or different from each other, and a is 0 or 1, and $R^4$ is an alkoxy, and b is 0 to 2, inclusive, said amount being calculated so that there are greater than 1.3 moles ketoximosilane per silanol equivalent in the diorganosiloxane base polymer and the calcium carbonate filler.

2. The composition of claim 1 in which the diorganosiloxane base polymer is polydimethylsiloxane of viscosity 10 Pa.s to 20 Pa. s, in which 10 to 20% of the endgroups are capped with triorganosilyl endblocker, and 80 to 90% of the endgroups are silanol.

3. The composition of claim 1 in which the diorganosiloxane plasiticizer is polydimethylsiloxane with viscosity of about 1 to 5 Pa.s.

4. The composition of claim 1 in which the $R^1$ and $R^2$ on the ketoximosilane are methyl, ethyl, amyl or isobutyl.

5. The composition of claim 1 in which $R^3$ on the ketoximosilane is methyl, ethyl, butyl, or vinyl.

6. The composition of claim 1 in which $R^4$ is a methoxy group.

7. The composition of claim 1, in which 0.3 to 1.0% of an epoxy-functional alkoxysilane is added.

8. The composition of claim 7 where the epoxy-functional alkoxysilane is gamma-glycidoxypropyl trimethoxysilane.

9. The composition of claim 1 where the calcium carbonate filler of water content greater that 0.25% is a treated precipitated calcium carbonate.

10. The composition of claim 1 where the amount of ketoximosilane is 1.3 to 2.5 moles per mole of total silanol equivalent from the base polymer and the filler.

11. A method of making a room temperature curing silicone sealant composition utilizing high moisture fillers, the method comprising combining, based on the weight of the silicone sealant composition:

25 to 75% diorganosiloxane base polymer of viscosity 1.0 Pa.s to 300 Pa.s, in which the terminal groups are selected from the group consisting of silanol and triorganosilyl groups, provided that at least 60% of the terminal groups are silanol groups;

0 to 25% triorganosilyl endblocked polydiorganosiloxane fluid of viscosity 0.1 Pa.s to 10 Pa.s;

17 to 65% calcium carbonate filler, where the filler contains greater than 0.25% water by weight;

0.01 to 2% tin catalyst;

0 to 2.0% of an epoxy-functional alkoxysilane; and an amount of a ketoximosilane of the formula

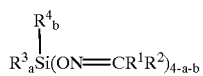

where $R^1$, $R^2$, and $R^3$ are monovalent hydrocarbons which may be the same or different from each other, and a is 0 or 1, and $R^4$ is an alkoxy, and b is 0 to 2, inclusive, said amount being calculated so that there are greater than 1.3 moles ketoximosilane per silanol equivalent in the diorganosiloxane base polymer and the calcium carbonate filler.

12. The method of claim 11 in which the diorganosiloxane base polymer is polydimethylsiloxane of viscosity 10 Pa.s to 20 Pa.s, in which 10 to 20% of the endgroups are capped with triorganosilyl endblocker, and 80 to 90% of the endgroups are silanol.

13. The method of claim 11 in which the diorganosiloxane plasiticizer is polydimethylsiloxane with viscosity of about 1 to 5 Pa.s.

14. The method of claim 11 in which the $R^1$ and $R^2$ on the ketoximosilane are methyl, ethyl, amyl or isobutyl.

15. The method of claim 11 in which $R^3$ on the ketoximosilane is methyl, ethyl, butyl, or vinyl.

16. The method of claim 11 in which $R^4$ is a methoxy group.

17. The method of claim 11, in which 0.3 to 1.0% of an epoxy-functional alkoxysilane is added.

18. The method of claim 17 where the epoxy-functional alkoxysilane is gamma-glycidoxypropyl trimethoxysilane.

19. The method of claim 11 where the calcium carbonate filler of water content greater that 0.25% is a treated precipitated calcium carbonate.

20. The method of claim 11 where the amount of ketoximosilane is 1.3 to 2.5 moles per mole of total silanol equivalent from the base polymer and the filler.

* * * * *